United States Patent
Celi, Jr. et al.

(10) Patent No.: US 7,058,046 B2
(45) Date of Patent: Jun. 6, 2006

(54) SCALABLE CALL MANAGEMENT SYSTEM

(75) Inventors: Joseph Celi, Jr., Boca Raton, FL (US); Brett Gavagni, Sunrise, FL (US); Margarita Zabolotskaya, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 09/999,474

(22) Filed: Nov. 15, 2001

(65) Prior Publication Data

US 2003/0091025 A1    May 15, 2003

(51) Int. Cl.
H04L 12/50    (2006.01)

(52) U.S. Cl. .................. 370/352; 370/353; 370/354; 370/355; 370/356; 370/401

(58) Field of Classification Search ........ 370/352–356, 370/401, 389, 392
See application file for complete search history.

(56) References Cited

U.S. PATENT DOCUMENTS

| | | | |
|---|---|---|---|
| 5,276,731 A | 1/1994 | Arbel et al. ................. 379/88 |
| 5,289,368 A | 2/1994 | Jordan et al. ............... 364/401 |
| 5,325,292 A | 6/1994 | Crockett .................... 364/401 |
| 5,384,831 A | 1/1995 | Creswell et al. .............. 379/67 |
| 5,446,883 A | 8/1995 | Kirkbride et al. ........... 395/600 |
| 5,848,143 A | 12/1998 | Andrews et al. ............ 379/219 |
| 5,911,134 A | 6/1999 | Castonguay et al. ........... 705/9 |
| 5,946,386 A | 8/1999 | Rogers et al. ............... 379/265 |
| 5,974,135 A | 10/1999 | Breneman et al. .......... 379/265 |
| 5,999,525 A | 12/1999 | Krishnaswamy et al. ... 370/352 |
| 5,999,537 A | 12/1999 | Tanabe et al. .............. 370/409 |
| 6,014,437 A | 1/2000 | Acker et al. ................ 379/219 |
| 6,061,347 A | 5/2000 | Hollatz et al. .............. 370/352 |
| 6,061,442 A | 5/2000 | Bhat ........................ 379/269 |
| 6,088,443 A | 7/2000 | Darland et al. ............. 379/265 |
| 6,094,479 A | 7/2000 | Lindeberg et al. .......... 379/220 |
| 6,097,804 A | 8/2000 | Gilbert et al. .............. 379/230 |
| 6,111,873 A | 8/2000 | Mandalia et al. ........... 370/352 |
| 6,122,364 A | 9/2000 | Petrunka et al. ............ 379/265 |
| 6,128,304 A | 10/2000 | Gardell et al. .............. 370/401 |
| 6,134,530 A | 10/2000 | Bunting et al. ................ 705/7 |
| 6,137,869 A | 10/2000 | Voit et al. ................... 379/114 |
| 6,141,341 A | 10/2000 | Jones et al. ................. 370/352 |
| 6,148,065 A | 11/2000 | Katz ......................... 379/88.2 |
| 6,161,008 A | 12/2000 | Lee et al. .................... 455/414 |
| 6,163,535 A | 12/2000 | Jordan et al. ............... 370/352 |
| 6,167,253 A | 12/2000 | Farris et al. ................ 455/412 |
| 6,181,935 B1 | 1/2001 | Gossman et al. ........... 455/433 |
| 6,185,285 B1 | 2/2001 | Relyea et al. ............... 379/207 |
| 6,185,288 B1 | 2/2001 | Wong ........................ 379/219 |
| 6,185,292 B1 | 2/2001 | Miloslavsky ................ 379/265 |
| 6,188,760 B1 | 2/2001 | Oran et al. .................. 379/230 |
| 6,188,762 B1 | 2/2001 | Shooster .................... 379/265 |
| 6,198,739 B1 | 3/2001 | Neyman et al. ............. 370/353 |

(Continued)

*Primary Examiner*—Chi Pham
*Assistant Examiner*—Alexander Kuo
(74) *Attorney, Agent, or Firm*—Akerman Senterfitt

(57) ABSTRACT

A scalable call management system. The system can include at least one voice server hosting one or more voice browsers, the voice server having a single communications port through which voice call requests can be processed by the voice browsers, each voice browser having a port alias through which call requests can be processed. The system also can include a call processing gateway linking telephony endpoints in a public switched telephone network (PSTN) to the voice server. Finally, the system can include a translation table mapping port aliases to respective voice browsers.

13 Claims, 3 Drawing Sheets

U.S. PATENT DOCUMENTS

| | | | |
|---|---|---|---|
| 6,212,261 B1 | 4/2001 | Meubus et al. | 379/88.12 |
| 6,215,784 B1 | 4/2001 | Petras et al. | 370/356 |
| 6,219,087 B1 | 4/2001 | Uiterwyk et al. | 348/14.08 |
| 6,222,919 B1 | 4/2001 | Hollatz et al. | 379/266 |
| 6,717,937 B1 * | 4/2004 | Kao | 370/352 |
| 6,928,068 B1 * | 8/2005 | Crowe et al. | 370/352 |

* cited by examiner

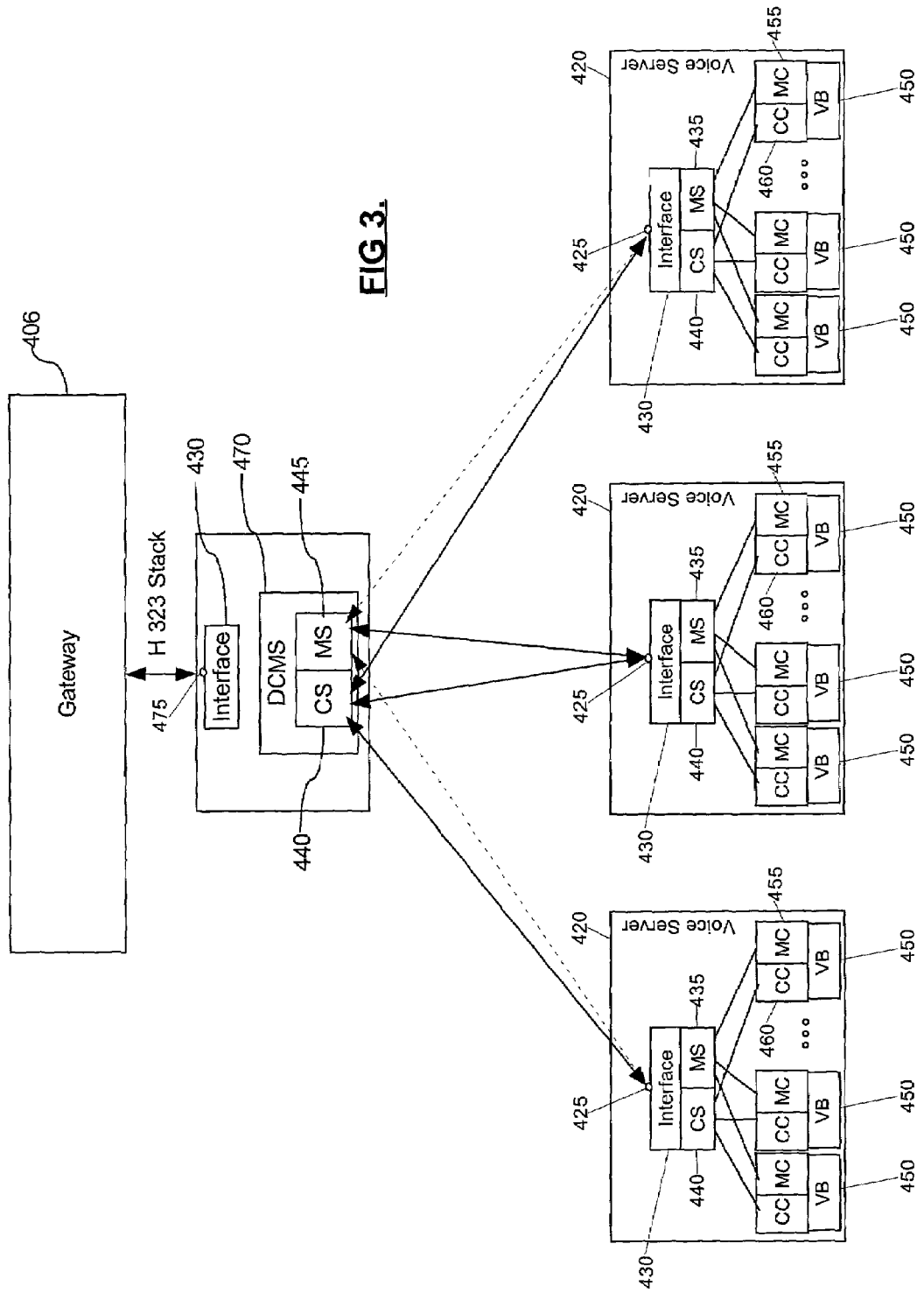

SCALABLE CALL MANAGEMENT SYSTEM

BACKGROUND OF THE INVENTION

1. Technical Field

The invention relates to the field of call management systems and more particularly, to Internet protocol (IP) telephony based call management systems.

2. Description of the Related Art

IP telephony provides an alternative to conventional circuit switched telephony which requires the establishment of an end-to-end communication path prior to the transmission of information. In particular, IP telephony permits packetization, prioritization and simultaneous transmission of voice traffic and data without requiring the establishment of an end-to-end communication path. As a result, IP telephony can capitalize upon Voice over IP (VOIP) technologies which advantageously provide a means by which voice traffic and data can be simultaneously transmitted across IP networks.

Common applications of IP telephony can include the integration of voice mail and electronic mail (e-mail). Other applications can include voice logging by financial or emergency-response organizations. Additionally, automated call distribution and interactive voice response (IVR) systems can employ IP telephony as a workflow component. Nevertheless, call management systems, have lagged in the utilization of IP telephony. In particular, call management systems operate on real-time audio signals which cannot tolerate latencies associated with traditional data communications. As such, where call management systems are implemented using an IP telephony topology, the speech processing portions of the call management systems have been closely integrated with the IP telephony portion in order to overcome the inherent latencies of traditional data communications. In consequence, the design and development of IP telephony enabled call management systems have been closely associated with the proprietary nature of IP telephony.

The close association between speech processing and IP telephony portions of a call management system substantially limits both the design and the extensibility of the speech processing portion of the call management system. Specifically, in the present paradigm the speech processing design can incorporate functionality directly job related to the chosen protocol for transporting packetized voice data to a speech application. As a result, the development of a superior voice transport protocol, the nature of the tight linkage between the IP telephony server and the speech processing portion of the call management system can compel the redesign of the speech application.

Aside from the close association between the IP telephony and speech processing portions of call management applications, IP telephony based call management systems can provide telephony support for a single voice browser session in a voice server. Both the single voice browser implementation and the proprietary nature of such call management systems, however, can substantially limit scalability. The scalability problem can be compounded where multi-vendor applications are integrated within such call management systems. While attempts have been made to standardize IP telephony interfaces, such as the Java Telephony Application Programming Interface (JTAPI), such attempts still remain limited to providing IP telephony support through single voice browsers within single voice servers.

FIG. 1 is a schematic depiction of a call management system configured for IP telephony which illustrates the foregoing deficiencies. Specifically, the call management system 100 can include one or more telephony end-points through which individual callers can interact with individual voice servers 120, 130, 140 over the telephony network 105. The call management system 100 further can include a voice gateway 106 which can convert call request data configured for use in the telephony network to packet-based request data suitable for use in an IP-based network. In that regard, the gateway 106 can be configured to route individual calls between individual telephony end-points 102a, 102b, 102c and voice browsers 122, 132, 142 of respective voice servers 120, 130, 140.

In the conventional call management system 100, each voice server 120, 130, 140 can include a voice browser 122, 132, 142 which can moderate a caller's voice interaction with voice-configured content stored in the respective voice server 120, 130, 140. Voice content can include markup specified content which, when interpreted by a voice browser 122, 132, 142, can be audibly presented to callers using conventional text-to-speech technology. Additionally voice content can include markup which, when interpreted by a voice browser, can convert caller-provided speech into computer processable text using conventional speech recognition technology. An exemplary markup language which can be used to format voice content can include the well-known VoiceXML.

In operation, a first caller can initiate a call to a speech application using the telephony end-point 102a. The call can include a call request that can be routed through the PSTN 105 to gateway 106. The gateway 106 can route the call to port 121 of voice server 120, where the call can be processed by voice browser 122. In addition to the first call, the gateway 106 can route a second call from a second caller at telephony end-point 102b to port 131 of voice server 130, where it can be processed by voice browser 132. Finally, the gateway 106 can route yet a third call from a third caller through telephony end-point 102c to port 141 of voice server 140, where it can be processed by voice browser 142.

Significantly, if the gateway 106 receives a fourth call request from a fourth caller 102d, the call request cannot be processed without adding an additional voice browser to complement the already utilized voice browsers 122, 132, 142. In particular, each voice browser 122, 132, 142 can handle only a single call at one time because each voice browser 122, 132, 142 has but a single port 121, 131, 141 for communicating directly with voice servers 120, 130, 140, respectively. In consequence of the single port limitation, however, it can be difficult and expensive to scale the call management system 100 to handle many call requests.

SUMMARY OF THE INVENTION

The present invention is a scalable call management system and method which overcomes the deficiencies of the prior art by providing a single port voice server able to manage calls between one or more corresponding voice browsers using a system of port aliases and a translation table mapping of the port aliases. In consequence of the call management system of the present invention, additional voice browsers can be added to the system to respond to call requests simply by creating additional instances of the voice browsers, assigning new port aliases for each additional voice browser instance, and mapping the new port aliases in the translation table.

In accordance with the inventive arrangements, a scalable call management system can be provided which can include at least one voice server hosting one or more voice browsers, the voice server having a single communications port through which voice call requests can be processed by the voice browsers, each voice browser having a port alias through which call requests can be processed. The system also can include a call processing gateway linking telephony endpoints in a public switched telephone network (PSTN) to the voice server. Finally, the system can include a translation table mapping port aliases to respective voice browsers.

Notably, the voice server can include a communications interface to the call processing gateway; and, at least one call control component communicatively linked to each of the voice browsers. In consequence, call requests received in the call processing gateway can be routed through the communications interface to selected ones of the voice browsers. Furthermore, resulting call connections can be managed by the at least one call control component.

In a distributed aspect of the system of the invention, a distributed call manager server can be provided which can include a communications interface to the call processing gateway and at least one call control component linking the voice servers to the distributed call manager server. In either case, however, each voice browser can execute in a separate virtual machine having a separate process address space. As such, the voice server can scale to accommodate changes in call activity by instantiating additional voice browsers in additional virtual machines and by associating a port alias for each additional voice browser in the translation table.

In another aspect of the invention, a call management method can be provided which can include the steps of registering a voice server with a gateway, the voice server having a plurality of registered voice browsers; and transferring telephone call data to and from each of the voice browsers using a port alias assigned to the voice browser and a port address assigned to the voice server to which each voice browser is registered. Importantly, the translating step can include inspecting a mapping of voice server ports and corresponding voice browser port aliases to identify voice servers and corresponding voice browsers which are available to process call requests; routing each received call request to an available voice browser in an available voice server; and, noting in the mapping that each available voice browser now is unavailable.

Significantly, the call management system of the present invention can scale in accordance with changing call processing requirements. In particular, the call management system method of the invention further can include adding additional voice browsers to the voice server and assigning additional port aliases to each of the additional voice browsers in response to detecting increased levels of call activity in the voice server. Alternatively, in response to detecting increased levels of call activity in the gateway, additional voice servers can be registered to the gateway, each additional voice server including one or more voice browsers.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

The present invention is a scalable call management system which overcomes the deficiencies of the prior art. Unlike conventional call management systems which are limited to providing IP telephony connectivity to single voice browsers within individual voice servers, in the scalable call management system of the present invention, IP telephony support can be extended to multiple voice browsers in individual voice servers, thus overcoming the limitations of the prior art. In particular, the scalable call management system of the present invention can cure deficiencies of the conventional call management system despite the single port configuration of individual voice servers.

In accordance with the present invention, a scalable call management system can include one or more voice servers communicatively linked to a VoIP gateway. Within each voice server, one or more voice browsers can be configured to receive and process calls from telephony endpoints despite the single port limitation of the voice server. Specifically, in the present invention, each voice browser can be assigned a different port identifier which can be associated with the voice server port of the respective voice server. During the transfer of call data between the gateway and a voice browser, the port identifier of the voice browser can be used by the voice server to resolve the identity of the voice browser, though the gateway need only maintain an awareness of the identity of the voice server. Advantageously, voice browsers can be distributed in the call management system of the present invention to facilitate scalability.

Figure 1:
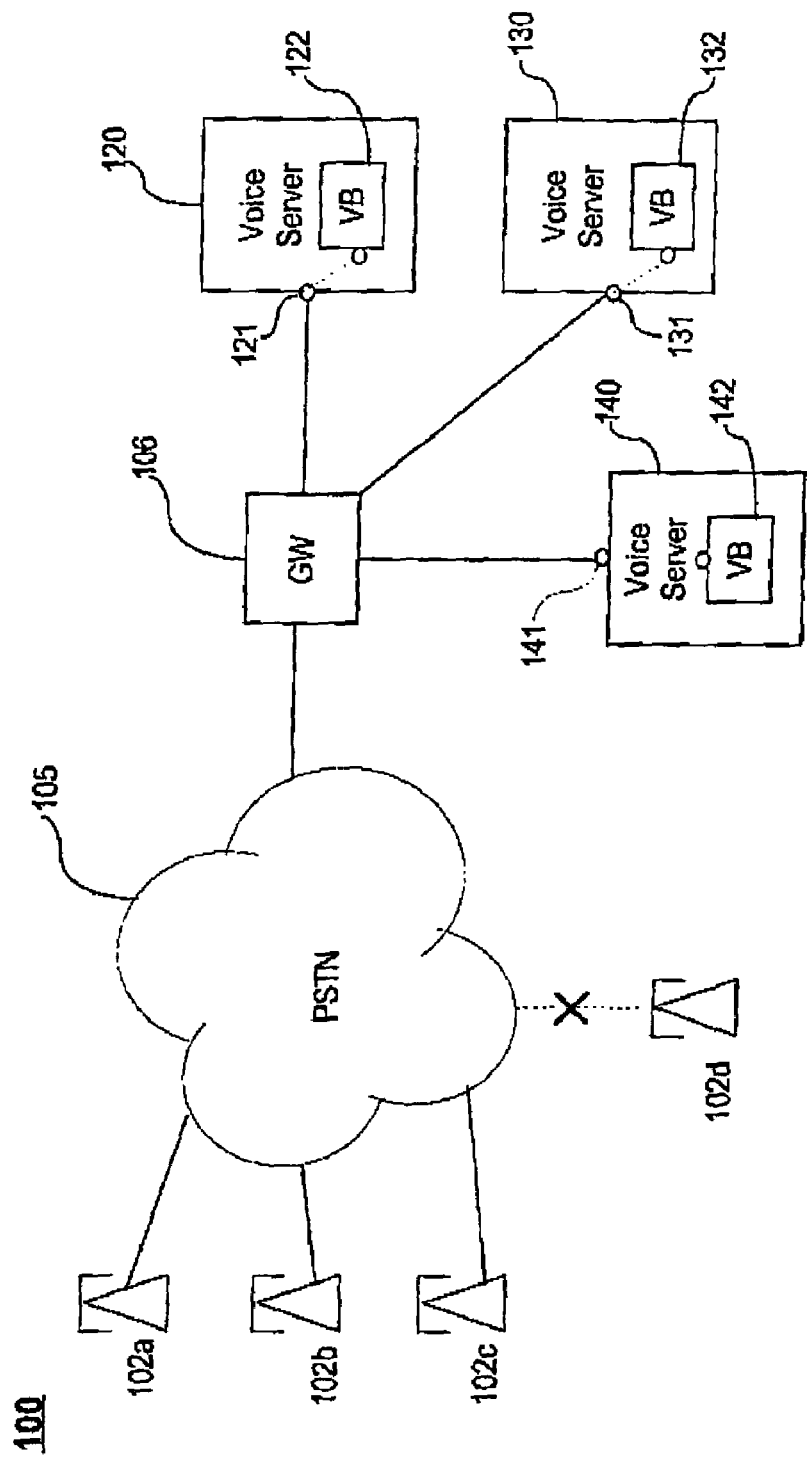
FIG. 1 illustrates a conventional call management system of the prior art.
Figure 2:
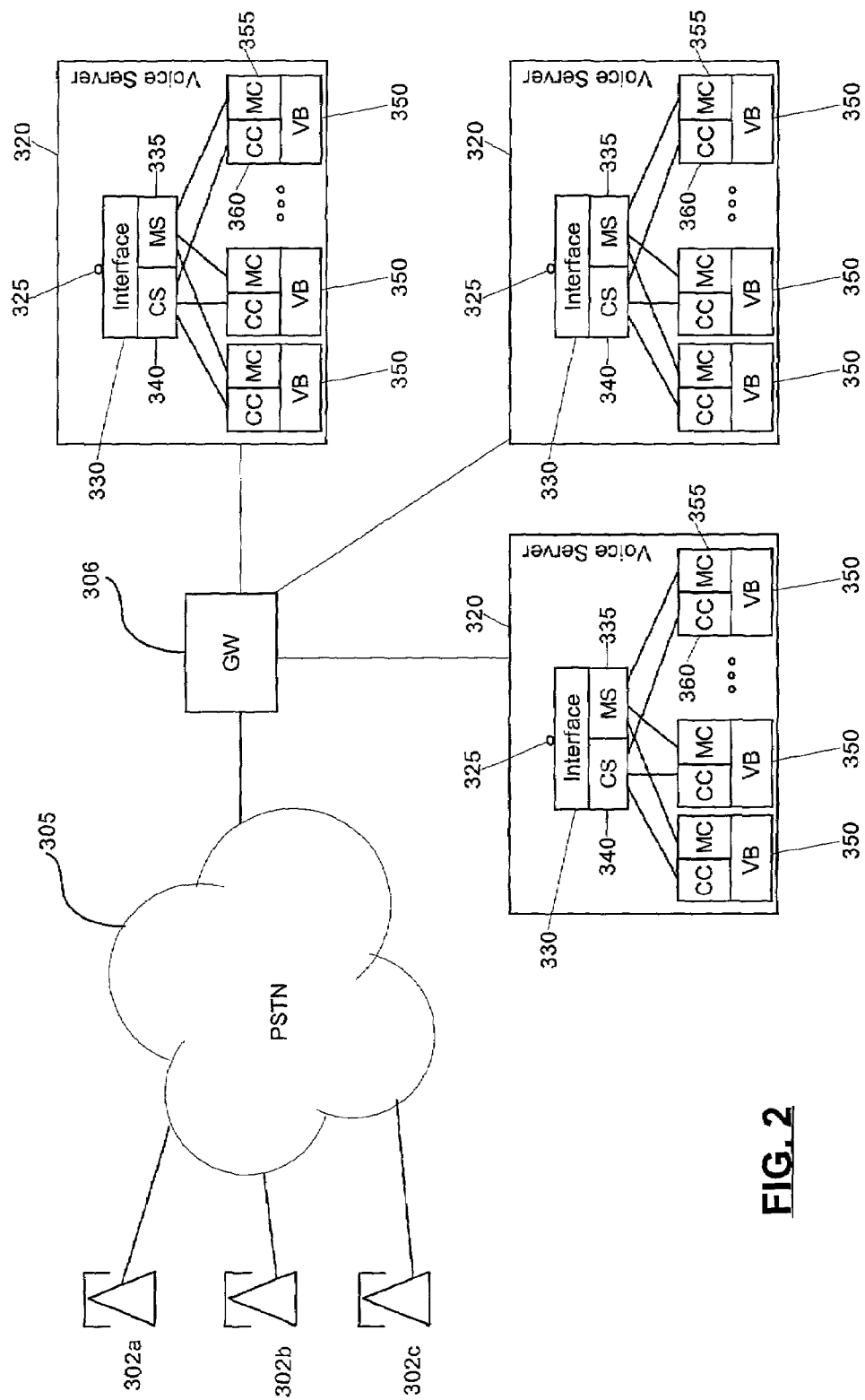
FIG. 2 is a schematic illustration of a call management system which has been configured in accordance with the inventive arrangements; and, FIG. 3 is a schematic illustration of a distributed call management system in accordance with the inventive arrangements.

FIG. 2 is a schematic illustration of a scalable call management system which has been configured in accordance with the present invention. Referring to FIG. 2, there is shown multiple voice servers 320, each having a single port 325 respectively. Each of the voice servers 320 can include an voice communications interface 330 that can facilitate communication with a VoIP gateway 306. In one aspect of the invention, the voice communications interface 330 can be a Java implementation of a H.323 stack, referred to in the art as J.323. Notwithstanding, the voice communications interface 330 can incorporate other voice protocol compatible interfaces such as a SIP compatible interface.

A call media server (MS) component 335 and a call control server (CS) component 340 also can be provided in each voice server 320 for facilitating communication between the voice communications interface 330 and one or more voice browsers 350. In particular, as will be apparent to one skilled in the art, the MS 335 and CS 340 components can be JTAPI applications which utilize an H.323 stack. Similar to the voice servers 320, each of the voice browsers 350 can be configured to include a call control client (CC) component 360 and a call media client (MC) component 355. The CS component 340 can facilitate call control for each of the voice browsers 350 managed by the voice server 320. In particular, the CC component 360 can manage call control between an associated voice browser 350 and the CS component of the parent voice server 320.

In order to overcome the inherent limitations of a single port voice server, in the present invention, each voice server 320 can include a translation table or map (not shown) which can be utilized to facilitate the transfer of call data between the gateway 306 and the voice browsers 350. An exemplary translation table is illustrated below.

| Gateway Port | Voice Server Port | Voice Server Port Status | Voice Browser Port | Voice Browser Port Status |
|---|---|---|---|---|
| P:400 | P:410 | 0 | P:410.410a | 0 |
| P:400 | P:410 | 0 | P:410.410b | 1 |
| P:400 | P:410 | 0 | P:410.410c | 1 |
| P:400 | P:420 | 1 | P:420.420a | 1 |
| P:400 | P:420 | 1 | P:420.420b | 1 |
| P:400 | P:420 | 1 | P:420.420c | 1 |
| P:400 | P:430 | 0 | P:430.430a | 0 |
| P:400 | P:430 | 0 | P:430.430b | 0 |
| P:400 | P:430 | 0 | P:430.430c | 0 |

Referring to the translation table above, each of the voice servers can be assigned a port number or identifier. For example, port 410 of one voice server can be assigned a port number P:410. By comparison, port 420 of another voice server can be assigned port number P:420 and so forth. Since each voice server has but a single port, individual voice browsers can be given an alias address, for example voice browsers 430a, 430b and 430c which are associated with the voice server having port 430 can be assigned respective port addresses of P:430:430a, P:430:430b and P:430:430c. Similarly, voice browsers 410a, 410b and 410c which are associated with the voice server having port 410 can be assigned respective port addresses of P:410:410a, P:410:410b and P:410:410c. Finally, the availability of each voice server and browser can be maintained in the translation table, for instance, a "1" denoting an unavailable port and a "0" denoting an available port.

In operation, when a call request is received by a gateway, the call request can be forwarded through gateway port P:400 to an available voice browser. Specifically, by consulting the translation table, a determination can be made as to which voice browser is available to process the call request. Once an available voice browser in an available voice server has been detected, the translation table can be consulted to determine the port number of the available voice browser. Once an available voice browser has been selected, the selected voice browser can process the call request.

As one skilled in the art will recognize, by providing individual alias port addresses for each voice browser in a server, and a corresponding translation table, the scalable call management system of the present invention can provide an efficient means for load balancing call requests received in a call processing gateway. Specifically, as call requests are received in the gateway, available voice servers having available voice browsers can be identified and the call requests can be passed therethrough. Additionally, as each voice server can host multiple voice browsers in separate virtual machines, the configuration of voice browsers can be changed dynamically to accommodate changing load requirements. Specifically, voice browsers can be loaded and unloaded as the case may be in each voice server. Hence, the call management system of the present invention can be scaled.

Importantly, the scalable call management system of the present invention can support telephony calling features such as automatic number identification/dialed name identification service (ANI/DNIS). As one skilled in the art will recall, ANI permits the billing number of a party as opposed to the directory number (DN) of the originating party to be transmitted through the network during call setup. By comparison, DNIS permits the authorization of a call attempt based on the called party's or billing party's DN. In the present invention, a voice browser 350 can be configured to register with a voice server 320 for an incoming call, during which process the voice browser 350 can instruct the CS 340 and MS 335 components to only route calls satisfying certain ANI and/or DNIS criteria to be processed by the voice browser 350.

Notably, in one aspect of the present invention, the functionality of the MS 335 and CS 340 components of each voice server can be provided within a single component, for example the distributed call management server (DCMS) 470 shown in FIG. 3. Referring now to FIG. 3, advantageously, the DCMS 470 can include a call control server 440, a call media server 445, and a voice browser 450 in order to provide a distributed interface that permits individual voice server 420 to register for incoming calls. In consequence, each voice server 420 can execute on remote or local systems and can be platform, including machine and operating system (OS), independent.

A VoIP gateway 406 can be communicatively linked to a port 475 of the DCMS server 470 through a communications interface 430, such as an H.323 compatible stack. In particular, the communications interface 430 can facilitate communication between the DCMS 470 and the gateway 406. Notably, like each voice server 420, the DCMS 470 can execute within a process address space which is separate and independent of each of the voice servers 420. For example, in a Java based implementation, the DCMS 470 can executed in its own JVM. Since each of the voice servers 420 also can have a call control client interface 440 and call media client interface 435, each voice server 420 also can execute within separate JVMs. Each voice server 420 can further include a call control (CC) component 460 and a call media client (MC) component 455. Advantageously, this distributed architecture con permit great flexibility in scaling the call management system of the present invention.

The present invention can be realized in hardware, software, or a combination of hardware and software. A distributed call management system according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A scalable call management system, comprising:
   at least one voice server hosting a plurality of voice browsers, said at least one voice server having a single communications port through which voice call requests can be processed by said voice browsers, each said voice browser having a port alias through which said call requests can be processed;
   a call processing gateway linking telephony endpoints in a public switched telephone network (PSTN) to said at least one voice server; and,
   a translation table mapping port aliases to respective voice browsers.

2. The scalable call management system of claim 1, wherein said at least one voice server comprises:
   a communications interface to said call processing gateway; and,
   at least one call control component communicatively linked to each of said voice browsers;
   wherein call requests received in said call processing gateway can be routed through said communications interface to selected ones of said voice browsers, and resulting call connections can be managed by said at least one call control component.

3. The scalable call management system of claim 1, further comprising:
   a distributed call manager server comprising a communications interface to said call processing gateway and at least one call control component linking said voice servers to said distributed call manager server.

4. The scalable call management system of claim 1, wherein each said voice browser executes in a separate virtual machine having a separate process address space.

5. The scalable call management system of claim 4, wherein said at least one voice server can scale to accommodate changes in call activity by instantiating additional voice browsers in additional virtual machines and by associating a port alias for each additional voice browser in said translation table.

6. A scalable call management method comprising:
   registering a voice server with a gateway, said voice server having a plurality of registered voice browsers; and
   transferring telephone call data to and from each of said voice browsers using a port alias assigned to said voice browser and a port address assigned to said voice server to which each said voice browser is registered.

7. The method of claim 6, further comprising:
   responsive to detecting increased levels of call activity in said voice server, adding additional voice browsers to said voice server and assigning additional port aliases to each of said additional voice browsers.

8. The method of claim 6, further comprising:
   responsive to detecting increased levels of call activity in said gateway, registering additional voice servers to said gateway, each said additional voice server comprising a plurality of voice browsers.

9. The method of claim 6, wherein said transferring step comprises:
   inspecting a mapping of voice server ports and corresponding voice browser port aliases to identify voice servers and corresponding voice browsers which are available to process call requests;
   routing each received call request to an available voice browser in an available voice server; and,
   noting in said mapping that each said available voice browser now is unavailable.

10. A machine readable storage having stored thereon a computer program for scalable call management, said computer program comprising a routine set of instructions for causing the machine to perform the steps of:
    registering a voice server with a gateway, said voice server having a plurality of registered voice browsers; and
    transferring telephone call data to and from each of said voice browsers using a port alias assigned to said voice browser and a port address assigned to said voice server to which each said voice browser is registered.

11. The machine readable storage of claim 10, further comprising:
    responsive to detecting increased levels of call activity in said voice server, adding additional voice browsers to said voice server and assigning additional port aliases to each of said additional voice browsers.

12. The machine readable storage of claim 10, further comprising:
    responsive to detecting increased levels of call activity in said gateway, registering additional voice servers to said gateway, each said additional voice server comprising a plurality of voice browsers.

13. The machine readable storage of claim 10, wherein said transferring step comprises:
    inspecting a mapping of voice server ports and corresponding voice browser port aliases to identify voice servers and corresponding voice browsers which are available to process call requests;
    routing each received call request to an available voice browser in an available voice server; and,
    noting in said mapping that each said available voice browser now is unavailable.

* * * * *